(12) United States Patent
Iino et al.

(10) Patent No.: US 6,441,534 B2
(45) Date of Patent: Aug. 27, 2002

(54) ULTRASONIC MOTOR AND ELECTRONIC APPARATUS EQUIPPED WITH ULTRASONIC MOTOR

(75) Inventors: Akihiro Iino; Masao Kasuga, both of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/732,963

(22) Filed: Dec. 8, 2000

(30) Foreign Application Priority Data

Dec. 13, 1999 (JP) .......................................... 11-353023

(51) Int. Cl.[7] .............................................. H01L 41/08
(52) U.S. Cl. ................... 310/316.01; 310/317
(58) Field of Search .............................. 310/316.01, 317

(56) References Cited

U.S. PATENT DOCUMENTS

| | | | | |
|---|---|---|---|---|
| 5,770,912 A | * | 6/1998 | Suzuki et al. | 310/316.02 |
| 5,780,955 A | * | 7/1998 | Iino et al. | 310/316.01 |
| 6,064,138 A | * | 5/2000 | Iino et al. | 310/316.01 |
| 6,144,140 A | * | 11/2000 | Iino et al. | 310/316.02 |
| 6,274,963 B1 | * | 8/2001 | Estabrook et al. | 310/316.02 |

FOREIGN PATENT DOCUMENTS

JP           9-33262 A * 2/1999 ............ 310/316.01

* cited by examiner

Primary Examiner—Thomas M. Dougherty
(74) Attorney, Agent, or Firm—Adams & Wilks

(57) ABSTRACT

An ultrasonic motor has a self-excited oscillation circuit comprised of a vibrating body having a piezoelectric element and an amplifier circuit for amplifying an output signal of the piezoelectric element for oscillating the vibrating body in a predetermined natural mode. A moving body is disposed in contact with the vibrating body and is driven in response to oscillation of the vibrating body. A control signal generating circuit outputs to the self-excited oscillation circuit a drive command signal or a stop command signal to bring the self-excited oscillation circuit into a drive state to drive the moving body or a stop state, respectively. The control signal generating circuit is set so that a length of the drive command signal is a time period required for the self-excited oscillation circuit to start oscillating at a frequency corresponding to a given frequency for driving the moving body.

16 Claims, 11 Drawing Sheets

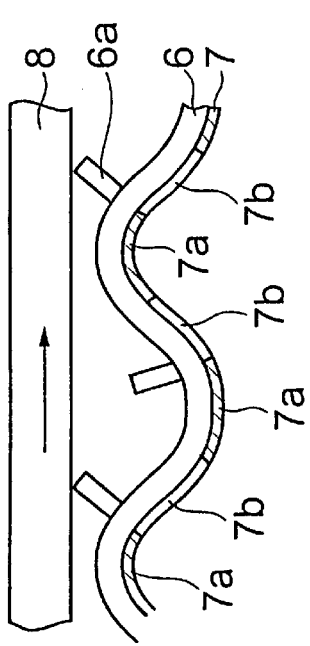
FIG.6A
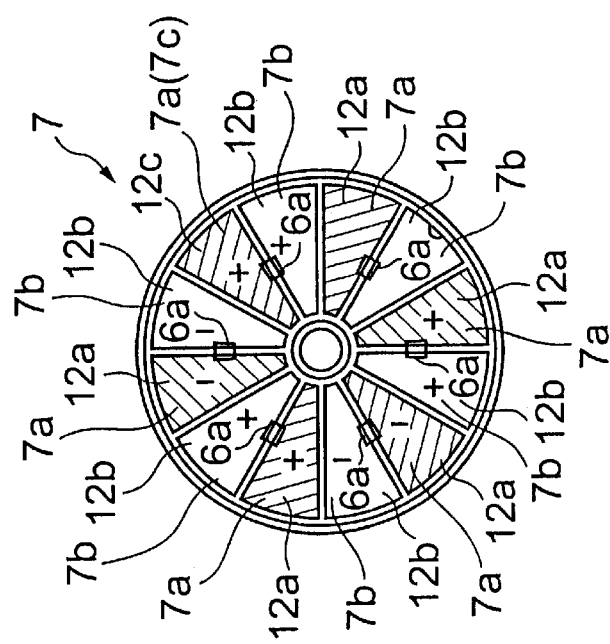
FIG.6B
FIG.6C
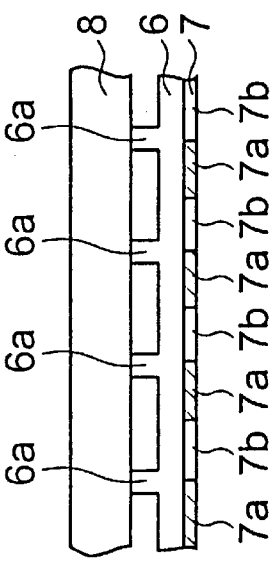
FIG.6D

ULTRASONIC MOTOR AND ELECTRONIC APPARATUS EQUIPPED WITH ULTRASONIC MOTOR

FIELD OF THE INVENTION

The present invention relates to an ultrasonic motor and an electronic apparatus having the ultrasonic motor, and particularly to a method of controlling an ultrasonic motor in which a self-excited oscillation circuit constituted by using the ultrasonic motor per se is operated as a drive circuit, and to an electronic apparatus using the ultrasonic motor.

DESCRIPTION OF THE RELATED ART

An ultrasonic motor begins to be used in various electronic apparatus since the ultrasonic motor is provided with excellent features of being small-sized, having high torque and high positioning resolution, and having hold force when electricity is not conducted. The drive circuit of an ultrasonic motor generally needs a frequency tracking circuit for tracking resonance frequency of the ultrasonic motor which is varied by temperature or external load to thereby pose a problem of bringing about complicated formation of the drive circuit or large-sized formation or high cost formation of a circuit mounting unit thereof. Hence, in recent years, there has been an example in which simplification of a drive circuit is achieved by using a self-excited oscillation circuit constituted by using an ultrasonic motor per se and an amplifying circuit.

However, when a drive circuit is constituted by using a self-excited oscillation circuit, there is a drawback that a time period is taken from when the drive circuit is brought into a drivable (ON) state until oscillation is started and an amplitude of oscillation increases and grows to a signal necessary for driving the ultrasonic motor.

Although when an ultrasonic motor is used for controlling position or speed, it is necessary to operate the ultrasonic motor intermittently by a very small amount by providing an intermittent signal to the ultrasonic motor or to make speed variable, when such a control is carried out by using the self-excited oscillation circuit in the drive circuit, there poses a problem in which a drive signal actually produced by the self-excited oscillation circuit cannot follow intermittent commands of driving/stopping the drive circuit, the ultrasonic motor cannot be started or operation thereof becomes unstable by causing abnormal oscillation.

SUMMARY OF THE INVENTION

Hence, according to the invention, a command signal for controlling a state of a self-excited oscillation circuit constituting a drive circuit is set in a range capable of stably driving an ultrasonic motor in an aimed state.

That is, according to an aspect of the invention, in an ultrasonic motor apparatus constituting a self-excited oscillation circuit by a vibrating body having a piezoelectric element and an amplifier circuit for oscillating the vibrating body in a predetermined natural mode and operating a moving body in contact with the vibrating body, the self-excited oscillation circuit can be controlled to be brought into a drive state or a stop state in accordance with a drive command signal or a stop command signal from a control signal generating circuit, and the control signal generating circuit is set such that a length TD of the drive command signal is made to be longer than a time period t1 from when the drive command signal is applied to the self-excited oscillation circuit until the self-excited circuit starts oscillating.

In this case, particularly, the length of the time period t1 is made to be a time period t2 until the self-excited oscillation circuit starts oscillating by a frequency component used for driving the moving body.

Further, in accordance with another embodiment, the length TD of the drive command signal is made longer than a time period t3 until an amplitude of oscillation of the self-excited oscillation circuit grows and reaches an amplitude value capable of operating the moving body, or longer than a time period t4 until the amplitude of the oscillation of the self-excited oscillation circuit grows and is saturated to a specific amplitude value. Alternatively, the length TD is set to fall in a range between the time period t3 and time period t4.

Further, by setting the control signal generating circuit such that a length TS of the stop command signal becomes shorter than a time period t9 from when the stop command signal is inputted to the self-excited oscillation circuit until the oscillation is stopped, a state of the moving body is controlled without stopping the oscillation.

When the ultrasonic motor apparatus is driven by alternately inputting the drive command signal and the stop command signal to the self-excited oscillation circuit, the time period TD and the time period TS are set such that an amount of changing a voltage value of an input unit of the amplifier circuit during a time period for applying the drive command signal in the time period TD, becomes larger than an amount of changing the voltage value of the input unit of the amplifier circuit during a time period for applying the stop command signal in the time period TS.

Further, in making variable the speed of the ultrasonic motor, a frequency 1/(TD+TS) of a control command signal constituted by the time period TD of the drive command signal and the time period TS of the stop command signal, is set to be higher than a frequency of the predetermined natural mode.

Further, by switching an oscillation state of operating the moving body and an oscillation state for making the moving body unable to operate by making a number of amplifier circuits brought into an active state among a plurality of the amplifier circuits, periodically variable, the moving body is driven or stopped or a speed thereof is changed without stopping the self-excited oscillation circuit to thereby produce stable oscillation.

Further, by mounting the above-described ultrasonic motor to an electronic apparatus, controllability of the electronic apparatus is promoted and small-sized and low power consumption can be achieved.

BRIEF DESCRIPTION OF THE DRAWINGS

FIGS. 6A–6D show operation principle of the ultrasonic motor according to the invention;

DETAILED DESCRIPTION OF THE PREFERRED EMBODIMENTS

A detailed explanation will be given of embodiments to which the invention is applied in reference to FIG. 1 through FIG. 13 as follows.

Embodiment 1

According to a drive circuit (separate excitation system) of a general ultrasonic motor, a drive signal having a constant amplitude is applied to the ultrasonic motor approximately simultaneously with application of a drive command signal. Meanwhile, according to a self-excited oscillation circuit dealt with by the invention, a time period is needed until start of oscillation and a time period is further needed to grow the oscillation to a constant value and accordingly, the conventional control method is not applicable and caution is required in a method of controlling the circuit. In this invention, a description will be given of a method of stably controlling and a method of driving an ultrasonic motor using a self-excited oscillation circuit constituting such a new drive circuit.

Figure 5:
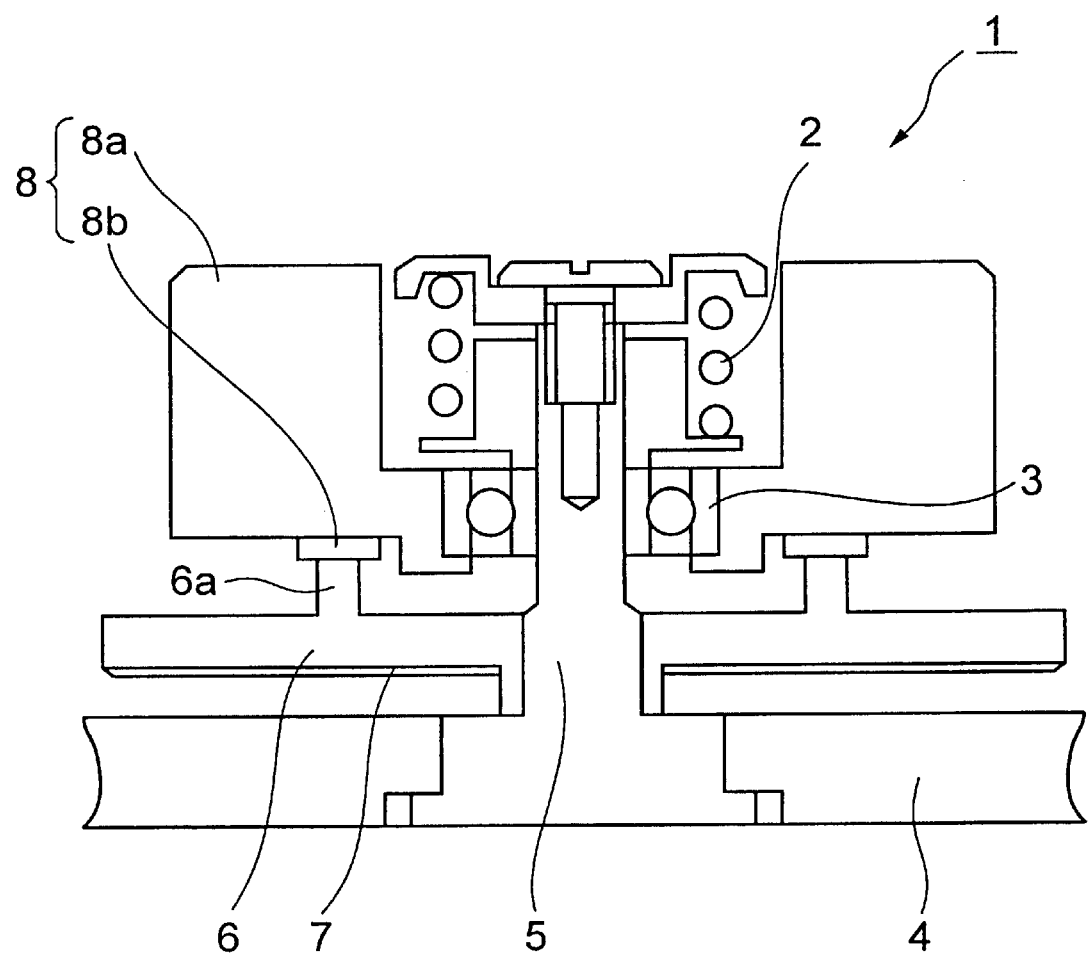
FIG. 5 shows a structure of an ultrasonic motor according to the invention.

FIG. 5 shows a structure of an ultrasonic motor 1 according to an embodiment applicable to the invention and FIG. 6 shows operation principle of the ultrasonic motor 1. In FIG. 5, a vibrating body 6 in a circular plate shape is supported by a center shaft 5 the center of which is fixed to a support plate 4. A first face of the vibrating body 6 is bonded with a piezoelectric element 7 and a second face thereof is provided with projections 6a for enlarging vibration displacement of the vibrating body 6 and providing rotational force to a moving body 8. A bearing 3 is provided at center of the moving body 8 and the center is guided by the center shaft 5. Further, contact pressure is provided between the projections 6a of the vibrating body 6 and a friction member 8a of the moving body 8 by pressing an inner ring of the bearing 3 by a pressure mechanism 2. A vibration wave excited at the vibrating body 6 is converted into the rotational force of the moving body 8 by the piezoelectric effect of the piezoelectric element 7.

FIG. 6 shows detailed operation principle. The piezoelectric element 7 bonded to the vibrating body 6 is polarized in a thickness direction such that a polarized area is divided in the circumferential direction at every quarter wavelength and a polarizing direction is reversed at every other division of the polarizing area. Electrode patterns disposed on one face of the piezoelectric element 7 and provided at the respective divisions of the polarizing area, are electrically short-circuited at every other division to thereby constitute two electrode pattern groups of hatched portions 12a and non-hatched portions 12b. Further, the vibrating body 6 and the piezoelectric element 7 are bonded such that the projections 6a of the vibrating body 6 are disposed right at boundaries of the electrode patterns. An electrode 12c is provided over a total of a bonded face thereof.

When a signal having a predetermined frequency is applied to the piezoelectric element of the pattern group 12a at the hatched portions, a standing wave as shown by FIG. 6C is generated at the vibrating body 6. The projections 6a which are elevated at that time, are inclined to the right side and accordingly, the moving body 8 in contact therewith is moved to the right. When the signal is applied to the pattern group 12b at the non-hatched portions, a standing-wave as shown by FIG. 6(d) is generated at the vibrating body 6 and the moving body 8 is moved in the left direction at this occasion.

Figure 7:
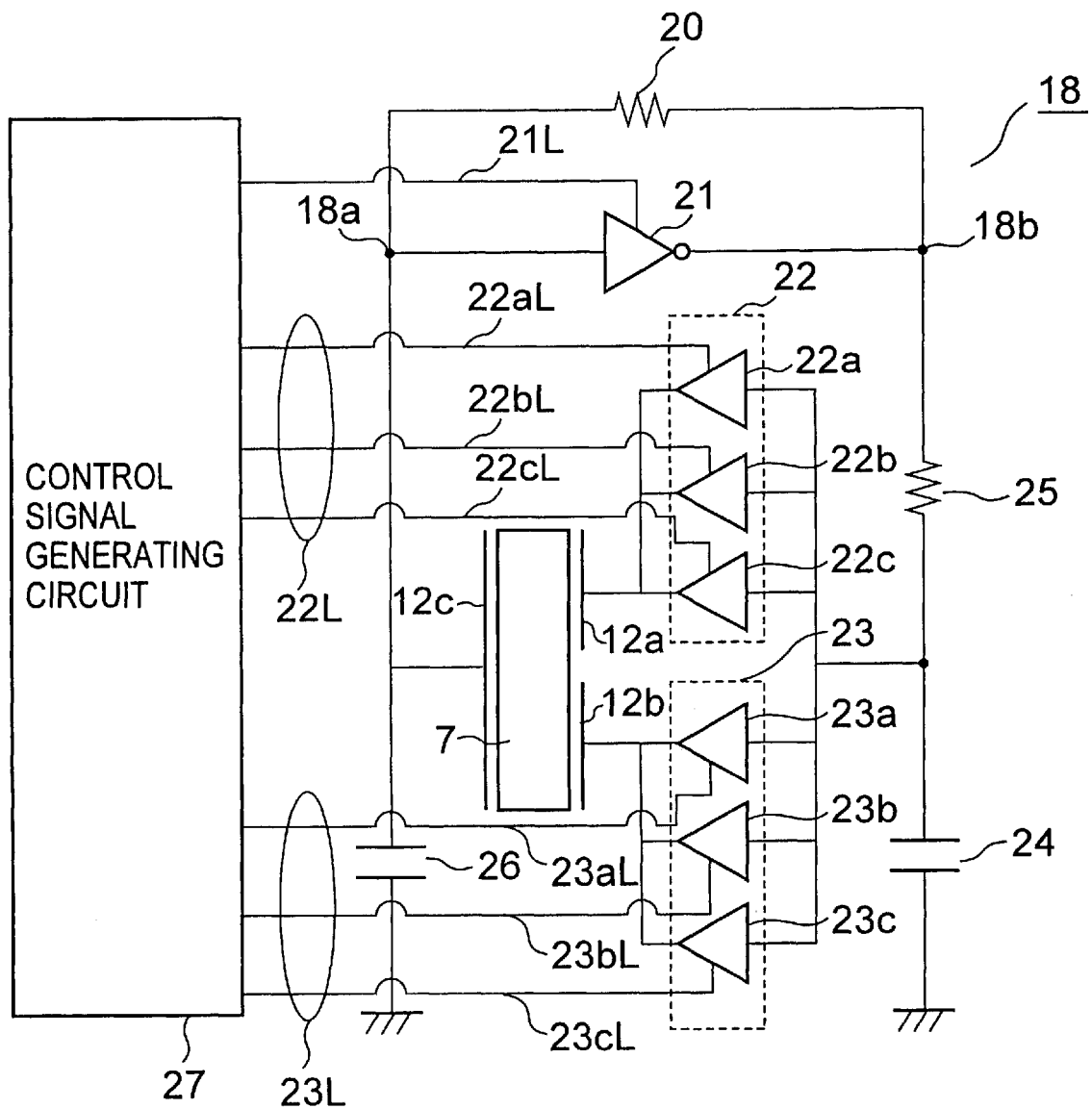
FIG. 7 shows a drive circuit of the ultrasonic motor according to the invention.

FIG. 7 shows a drive circuit 18 of the ultrasonic motor using the self-excited oscillation circuit.

Two buffers 22 and 23 are connected to the two electrode pattern groups of the piezoelectric element 7 (the hatched portions 12a and the non-hatched portions 12b in FIG. 6) of the piezoelectric element 7 independently from each other. A resonating circuit is constituted by the vibrating body 6 bonded with the piezoelectric element 7 and two condensers 24 and 26 and an inverted amplifier constituted by an inverter 21 and a resistor 20 continues oscillation by invertedly amplifying a signal from the resonating circuit and returning the signal to the resonating circuit. A resistor 25 constitutes a low pass filter along with the condenser 24 to thereby restrain spurious oscillation at a higher order.

In this case, the inverter 21 and the two buffers 22 and 23 are of a tri-state constitution and depending on signals inputted to control terminals 21L and 22L and 23L (for example, Low level signal), an output terminal can be brought into a high impedance state, that is, an output signal can be made OFF.

For example, by making an output signal of either of the buffers 22 and 23 OFF, switching of regular rotation or reverse rotation can be carried out. Further, by making the output signal of the inverter 21 or the two buffers 22 and 23 (bringing the output terminal into the high impedance state) OFF, the motor is stopped.

Figure 1:
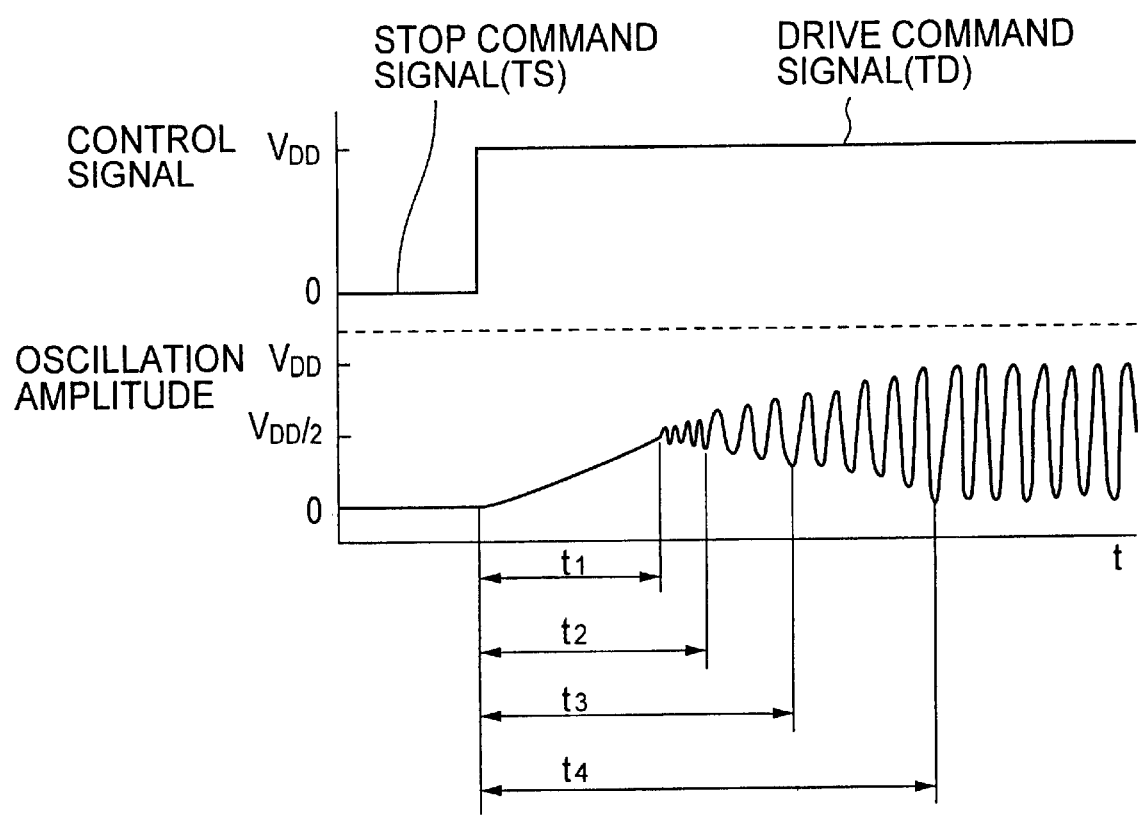
FIG. 1 is a diagram showing a behavior of a drive command signal and rise of an oscillation amplitude.

FIG. 1 shows a state of an oscillation amplitude at a point 18a of the self-excited oscillation circuit 18 when the inverter 21 and the buffer 22 are brought into an active state and a drive command signal for bringing the self-excited oscillation circuit 18 into a drive state, that is, a high level signal is outputted from a control signal generating circuit 27 and is inputted to a control terminal. (A similar state is constituted even when the inverter 21 is brought into the active state after the inverter 21 is brought into the active state).

In FIG. 1, when a time period t1 has elapsed since the drive command signal was applied to the self-excited oscillation circuit, oscillation of the self-excited oscillation circuit is started, after elapse of a time period t4, the oscillation amplitude is saturated to a constant value. At this occasion, a drive signal applied to the ultrasonic motor 1 also becomes a constant value.

Although the oscillation includes factors of the circuit constitution, the state of the ultrasonic motor 1, depending on cases, a component of a high spurious oscillation initially at the start of the oscillation, after elapse of time period t2, there is constituted the oscillation of a desired frequency component. Further, when there is constituted the oscillation amplitude after elapse of a time period t3, the amplitude of the vibrating body 6 grows to an amplitude value sufficient for moving the moving body 8 and the moving body 8 starts operating.

Actually, when the self-excited oscillation circuit 18 is constituted as shown by FIG. 7, the inverted amplifier circuit is constituted by the resistor 20 and the inverter 21 and the time period t1 until start of the oscillation is substantially equal to a time period until voltage at the point 18a becomes an operating point (VDD/2) of the inverted amplifier circuit. Although the voltage at the point 18a is initially 0V (Low level), when the active state is constituted by inputting the drive command signal to the control terminal of the inverter 21, the voltage at the point 18b becomes power source voltage VDD (High level). The voltage at a point 18b is charged to the condenser (C) 26 via the resistor (R) 20 and reaches the operating point after elapse of the time period t1. That is, $t1 = -CR\ln 0.5 = 0.693$ CR.

Figure 2:
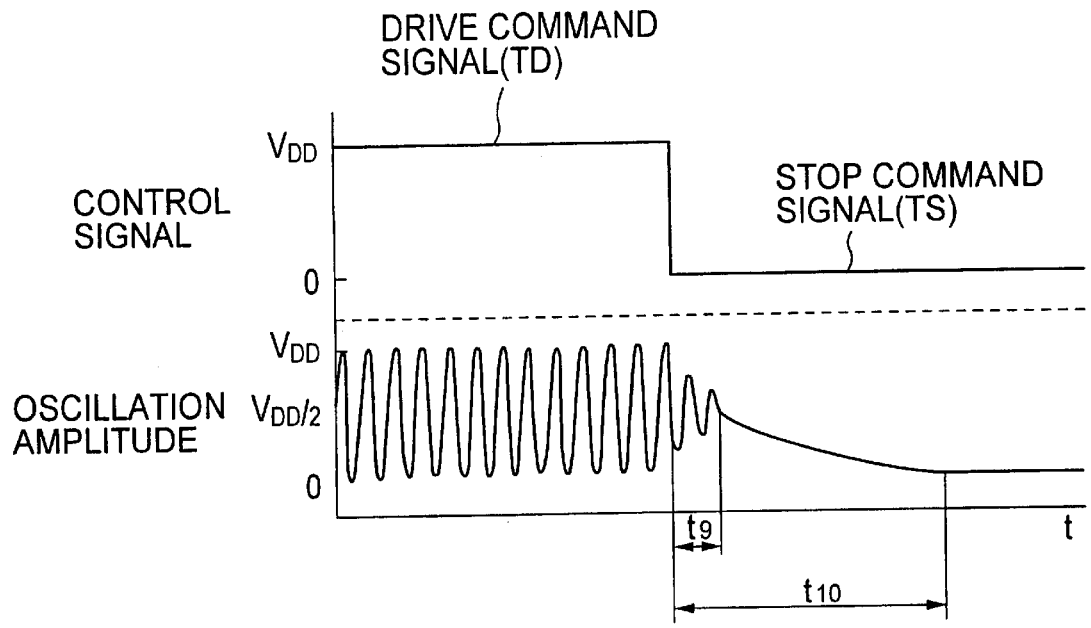
FIG. 2 is a diagram showing a behavior of a stop command signal and stop of an oscillation amplitude.

Further, when a stop command signal is applied to the control terminal 21L of the inverter 21 the self oscillation circuit which is in the state of oscillation, as shown by FIG. 2, after elapse of a time period t9, the oscillation amplitude becomes 0. Further, after elapse of a time period t10, the voltage becomes 0V (Low level).

Figure 3:
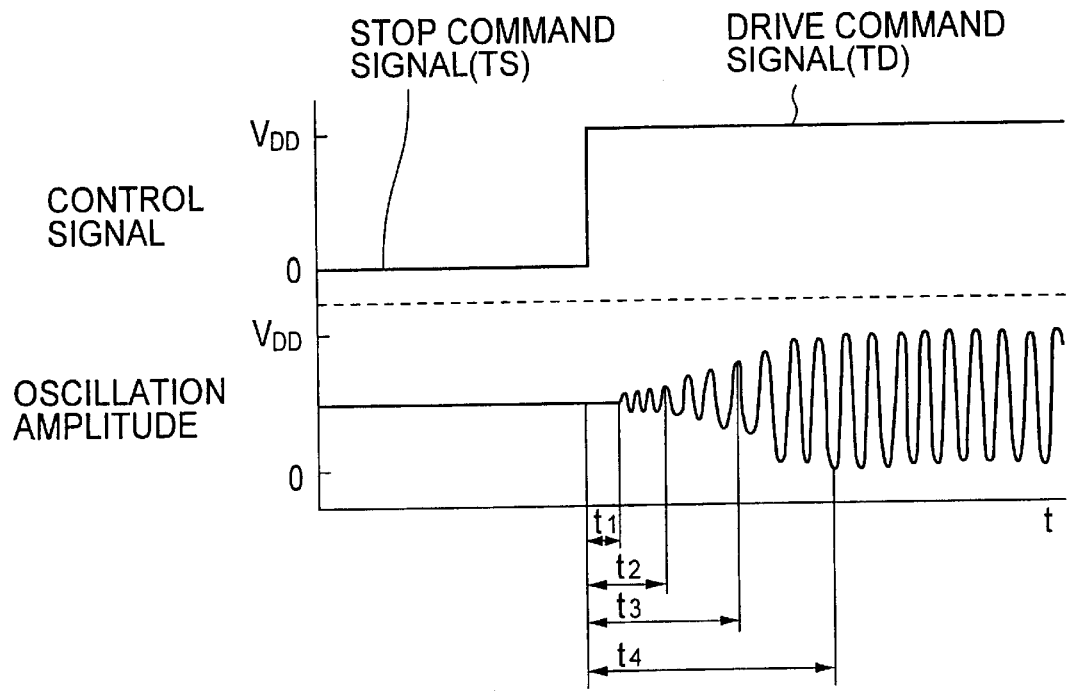
FIG. 3 is a diagram showing the other example of a behavior of a drive command signal and rise of an oscillation amplitude.
Figure 4:
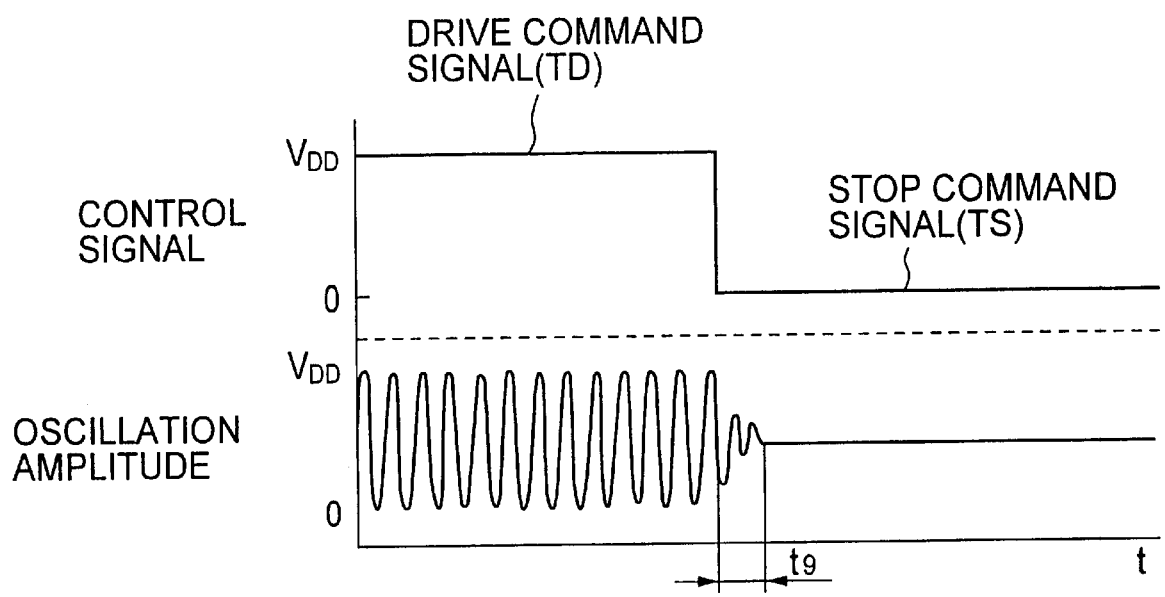
FIG. 4 is a diagram showing the other example of a behavior of a stop command signal and an oscillation amplitude.

Depending on the circuit constitution or a method of inputting the control signal, according to states of starting and stopping the oscillation with respect to the drive command signal and the stop command signal, as shown by FIGS. 3 and 4, only the oscillation is started and stopped while maintaining the voltage level at operating point, however, with respect to other point, the states are similar to those in FIGS. 1 and 2 and a control method shown below may be regarded as similar thereto. For example, according to the circuit constitution of FIG. 7, when the buffer 22 is brought into the active state after bringing the inverter 21 into the active state by the drive command signal from the control signal generating circuit 27, the states become similar to the states of starting and stopping the oscillation as shown by FIGS. 3 and 4.

Figure 8:
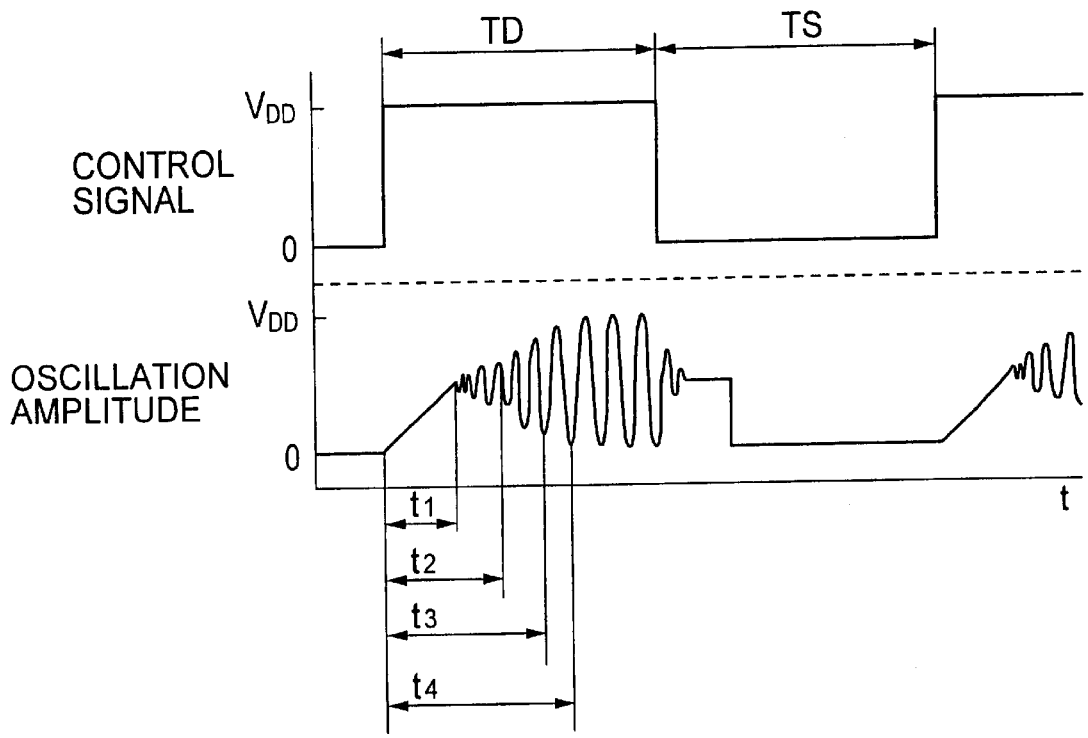
FIG. 8 is a diagram showing a behavior of an oscillation amplitude in correspondence with a drive command signal.

Therefore, as shown by FIG. 8, the oscillation can firmly be carried out by previously setting the control signal generating circuit 27 such that a length TD of the drive command signal (High level signal) from the control signal generating circuit 27 is made always longer than the time period t1 from when the drive command signal is applied until the oscillation is started. Particularly, when there are included signal components other than the aimed frequency at an initial stage of the oscillation, the control signal generating circuit 27 is set such that the length TD becomes always longer than the time period t2 at which these components have been attenuated and the oscillation of the aimed frequency component is constituted. The control signal generating circuit 27 comprises, other than the signal generating circuit for generating, for example, the control signal, CPU providing command thereto and ROM storing conditions and parameters of the length TD of the drive command signal and a length TS of the stop command signal and the like.

By determining a lower limit value of the length TD of the drive command signal from the control signal generating circuit 27 as described above, there can be carried out a stable step operation of the ultrasonic motor 1 without oscillation failure or abnormal oscillation. Further, when the length TD of the drive command signal is made variable in a range larger than the lower limit value, an amount of step or speed can be controlled stably.

Further, when there is a considerable difference between the time period t1 or t2 until start of the oscillation and the time period t3 until the moving body 8 actually starts moving, the lower limit value of the length TD of the drive command signal is set to be larger than the time period t3. Further, when the length TD of the drive command signal is made larger than the time period t4 until the oscillation has grown and saturated into a constant amplitude value, the drive signal applied to the ultrasonic motor is provided with a magnitude the same as that in a steady state and also in step drive, torque equivalent to that in continuous rotation can be provided.

Figure 9:
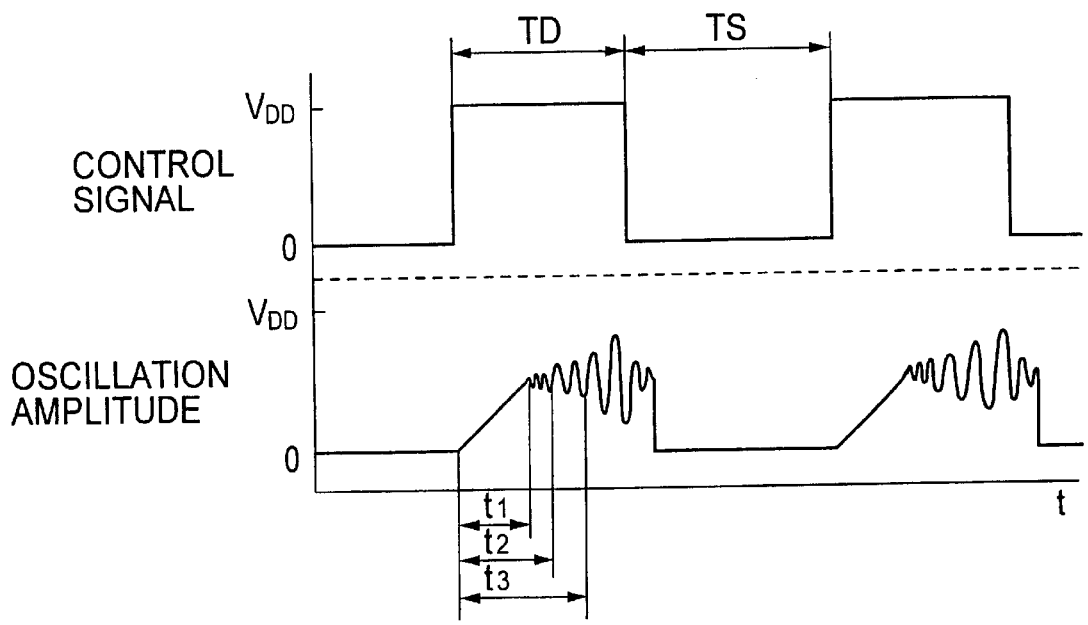
FIG. 9 is a diagram showing the other example of a behavior of an oscillation amplitude in correspondence with a drive command signal.

As shown by FIG. 9, by setting the length TD of the drive command signal between the time periods t3 and t4, an amount of moving the moving body 8 during the time period TD applied with the drive command signal becomes a very small amount and accordingly, fine positioning can be carried out.

Meanwhile, when the control signal generating circuit 27 is set such that the length TD of the drive command signal is driven between the time periods t3 and t4, the moving body can be moved finely.

Embodiment 2

According to the embodiment, there is shown a control method for providing stable oscillation and operation when the drive command signal and the stop command signal are alternately inputted to the self-excited oscillation circuit 18 to thereby drive the circuit.

When the self-excited oscillation circuit having the constitution as shown by FIG. 7 is used, as shown by FIG. 1 and FIG. 2, the voltage at the point 18a in the circuit gradually approaches the operating point (VDD/2) of the amplifier circuit comprising the resistor 20 and the inverter 21 with application of the drive command signal and starts oscillating from a time point substantially reaching the operating point. Further, thereafter, when the stop command signal is applied, the oscillation finally stops and finally settles to 0V (GND level).

Therefore, when the drive command signal and the stop command signal are alternately inputted to the self-excited oscillation circuit 18 to thereby drive the circuit, the time period TD of applying the drive command signal and the time period TS for applying the stop command signal are set such that an increase amount $\Delta IV$ of the voltage at the point 18a by the drive command signal (an amount of being proximate to the operating point: state after elapse of time period t1), becomes larger than a decrease amount $\Delta DV$ of the voltage at the point 18a by the stop command signal (an amount of being remote from the operating: state after elapse of time period t10), that is, $\Delta IV(TD) > \Delta DV(TS)$.

For example, when a rate of increase and a rate of decrease of the voltage at the point 18a with respect to the time periods TD and TS of applying the drive command signal and the stop command signal are the same, in a period (TD+TS) constituted by the time period TD of applying the drive command signal and the time period TS of applying the stop command signal, by increasing a rate of the time period TD of applying the drive command signal by more than 50%, it is possible that the voltage at the point 18a gradually reaches the operating point to thereby provide the oscillation.

Figure 10:
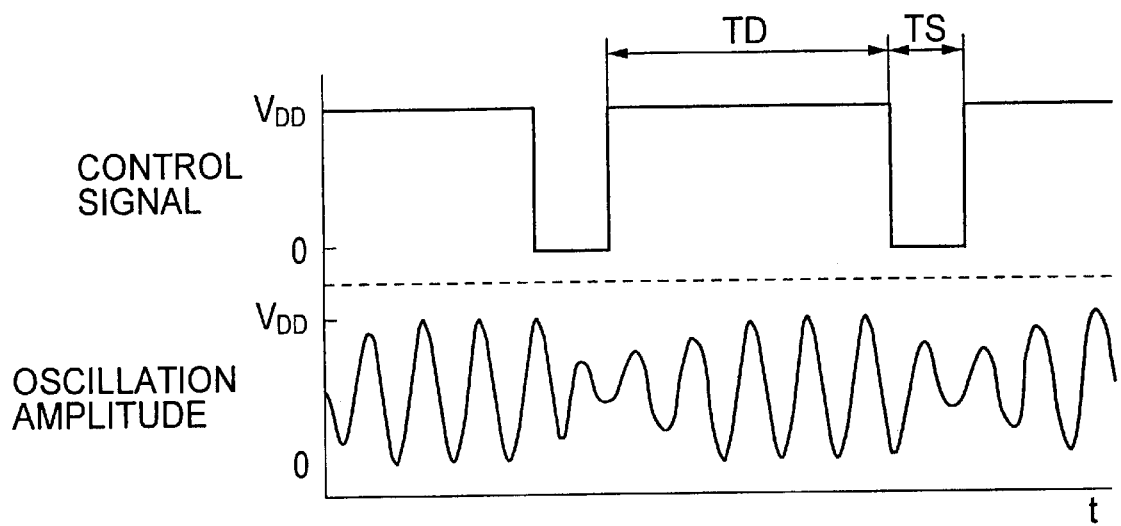
FIG. 10 is a diagram showing a behavior of an oscillation amplitude in correspondence with a drive command signal time period and a stop command signal time period.

Further, by determining the period (TD+TS) such that the time period TS of applying the stop command signal becomes shorter than the time period t9 from when the stop command signal is inputted to the self-excited oscillation circuit 18 until the oscillation is stopped, waveform and amplitude of the oscillation can be changed without stopping the oscillation and the speed of the ultrasonic motor 1 can be adjusted. FIG. 10 shows a behavior of the control signal and the oscillation amplitude at this occasion. In this case, a maximum value of the oscillation amplitude reaches a saturated values of the oscillation amplitude and accordingly, only the rotational number can be made variable while hardly reducing starting torque in comparison with that in steady state rotation.

By carrying out chopping control or PWM control by changing respective lengths and a ratio of the lengths of the control signals, that is, the drive command signal and the stop command signal from the control signal generating circuit 27 under the above-described condition, while restraining a reduction in torque, only the rotational number can be made variable.

Embodiment 3

According to the embodiment, there is shown the other embodiment of making variable the speed. In this case, when the ultrasonic motor 1 is driven by alternately inputting the drive command signal and the stop command signal to the self-excited oscillation circuit 18, the control signal generating circuit 27 is set such that a frequency 1/(TD+TS) of the control signal constituted by the time period TD of applying the drive command signal and the time period TS of applying the stop command signal, becomes higher than the drive frequency of the ultrasonic motor 1, that is, the frequency of the oscillation.

Thereby, energy flowing to the self-excited oscillation circuit 18 during one period of the oscillation can be controlled, in accordance with the ratio of the time period TD of applying the drive command signal to the time period TS of applying the stop command signal and the frequency 1/(TD+TS) the oscillation, that is, the amplitude value of the drive signal of the ultrasonic motor 1 can be made variable and speed control of the moving body 8 can be carried out.

Figure 11A:
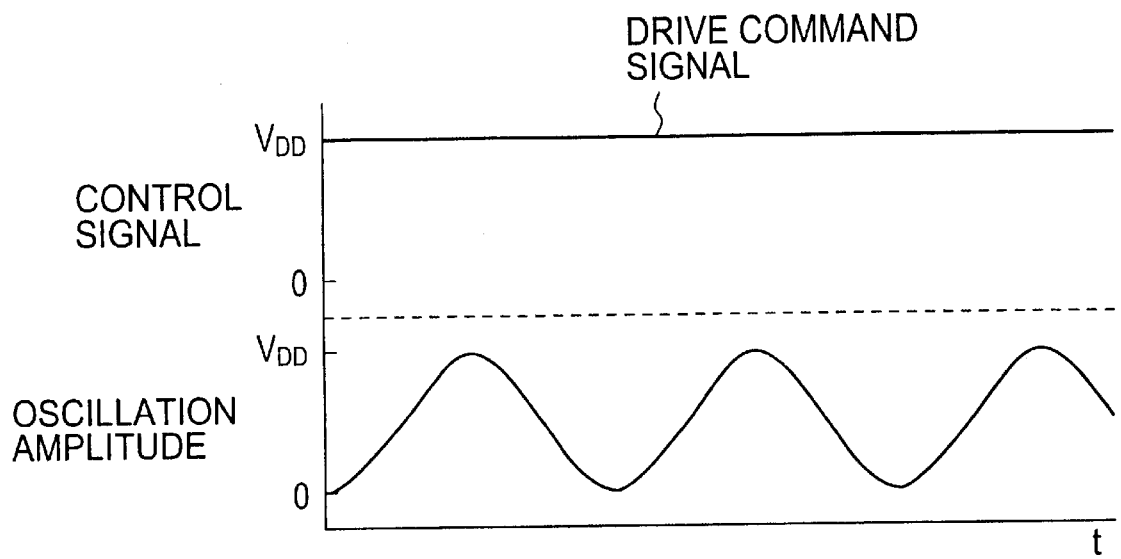
FIGS. 11A and 11B show a behavior of an oscillation amplitude when a frequency of a control signal is made higher than a drive frequency of an ultrasonic motor.
Figure 11B:
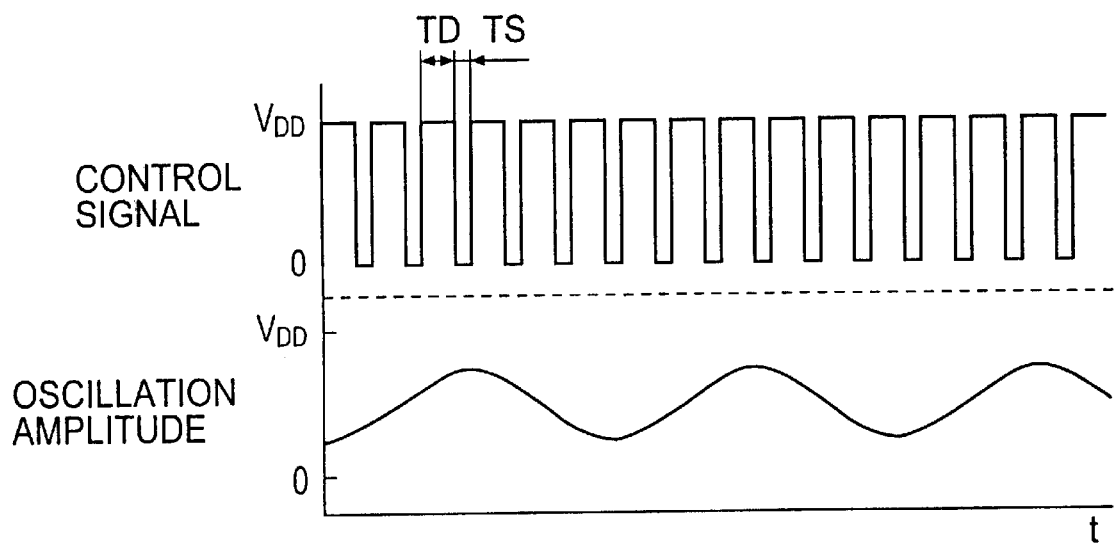

Fig. 11 shows a change in the amplitude of the oscillation when the ratio of the time period TD of applying the drive command signal to the time period TS of applying the stop command signal is changed. FIG. 10(a) shows a state of the amplitude of the oscillation when the drive command signal is constantly applied and FIG. 10(b) shows the amplitude of the oscillation when the stop command signals are applied at intervals shorter than the period of the oscillation.

Different from the case of FIG. 10, the amplitude of the oscillation becomes always a constant value and accordingly, a variation in the rotational number is extremely small and the motor can be driven at a lower speed.

Embodiment 4

A description will be given here of a method of improving a rise time period which is the drawback of the ultrasonic motor 1 using the self-excited oscillation circuit 18.

In the self-excited oscillation circuit 18 of FIG. 7, pluralities of the buffers 22 and 23 constituting the amplifier circuit are provided in parallel with each other. Among pluralities of buffers 22a, 22b, 22c, 23a, 23b and 23c, firstly, only a specific number of the buffers are brought into the active state to thereby oscillate and thereafter, the number of the buffers which are brought into the active state is increased to thereby operate the moving body 8.

Figure 12:
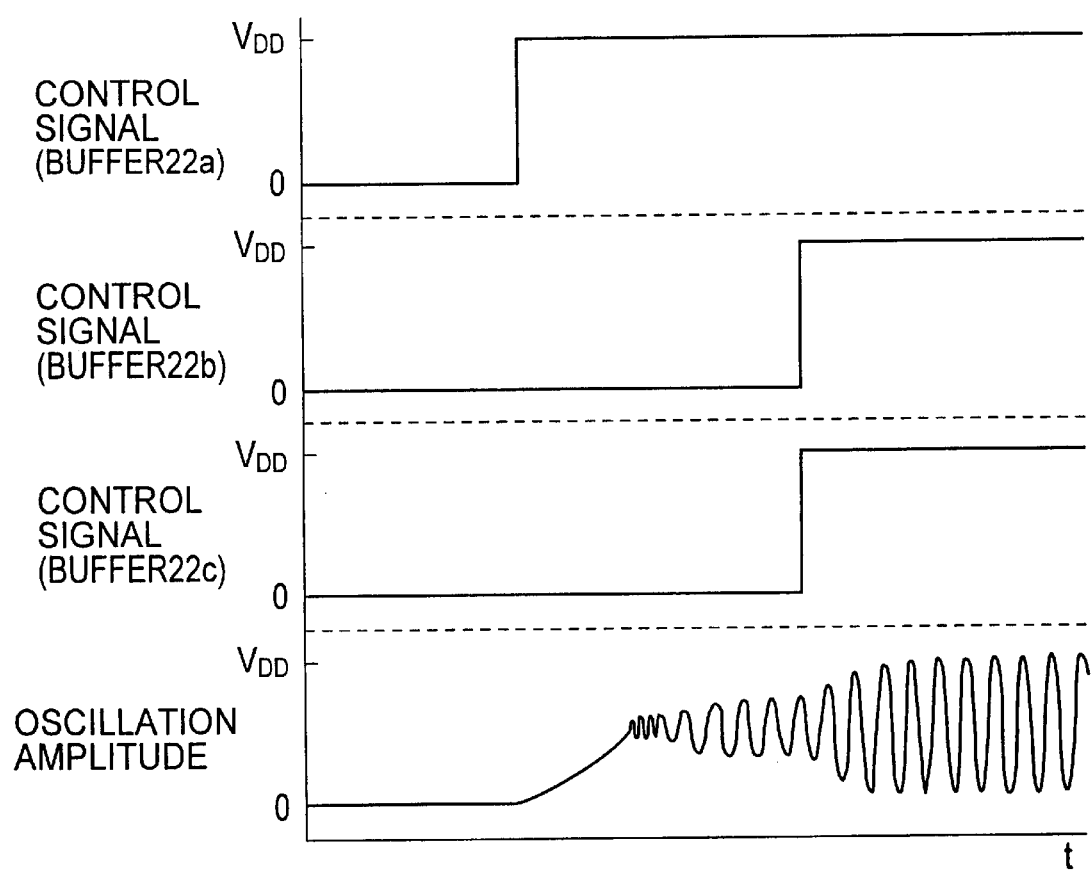
FIG. 12 is a diagram showing a state of an oscillation amplitude when a number of buffers constituting an active state is made variable.

The behavior is shown by FIG. 12. Before the moving body 8 is operated, only the buffer 22a is brought into the active state to thereby previously produce oscillation having an amplitude which cannot move the moving body 8, thereby, there can be realized the ultrasonic motor 1 capable of reducing the time period t1 until the oscillation is started, provided with a short time period for growing to an amplitude value capable of operating the moving body 8 since there is provided previously a constant amplitude value and having extremely fast rise. Further, there can be avoided non-start of the ultrasonic motor 1 by abnormal oscillation caused in starting the self-excited oscillation circuit 18. For example, in positioning by using a sensor such as an encoder, when the oscillation is not stopped at a vicinity of an aimed position for the time being, only operation of the moving body 8 is stopped and thereafter a deviation amount between the aimed position and a current position is corrected, fast positioning can be carried out. Further, when the oscillation is not similarly stopped even when the aimed position is exceeded, only the operation of the moving body 8 is stopped and thereafter, the deviation amount between the aimed position and the current position is corrected, fast positioning can be carried out.

Embodiment 5

Figure 13:
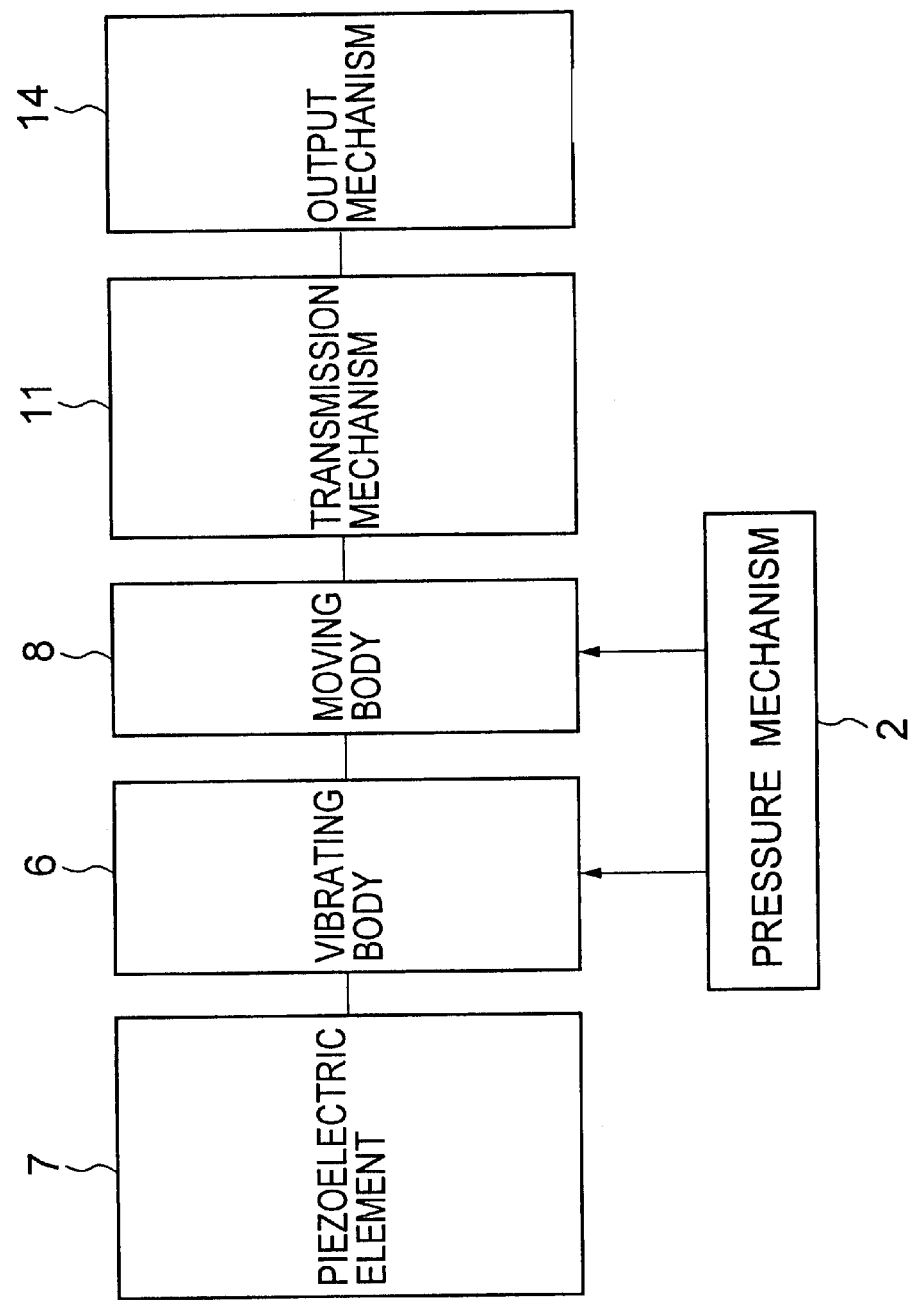
FIG. 13 shows an example of application in which an ultrasonic motor according to the invention is applied to an electronic apparatus.

FIG. 13 shows a block diagram of Embodiment 5 in which the ultrasonic motor according to the invention is applied to an electronic apparatus.

The electronic apparatus is featured in having the above-described vibrating body 6 and the moving body 8 driven by the vibrating body 6, a pressure means 2 for providing contact pressure to the moving body 8 and the vibrating body 6, a transmission mechanism 13 capable of moving in cooperation with the moving body 8 and an output mechanism 14 moving based on operation of the transmission mechanism 13. Further, in this case, a description has been given of driving and controlling the ultrasonic motor 1 in Embodiments 1 through 4 and therefore, an explanation will be omitted here.

In this case, in the transmission mechanism 13, there is used a transmission wheel such as gear or friction wheel. The transmission mechanism 13 may be omitted and the output mechanism may be provided directly. At the output mechanism 14, for example, there is used an indicator or an indicator drive mechanism, a display board such as calendar, or a display board drive mechanism in the case of an indicating apparatus or an electronic time piece, a mirror for changing a direction of laser in the case of a copy machine or a printer, a shutter drive mechanism, a diaphragm drive mechanism, a lens drive mechanism, or a film windup mechanism in the case of a camera or a video camera, a slit plate or a filter for blocking or transmitting light or transmitting only light having a specific wavelength in the case of a measuring instrument or a fabricating apparatus utilizing laser or light, a contact mechanism or a gap plate for making variable a resistance value or a capacitance value for a volume of an acoustic apparatus, or a pickup drive mechanism in the case of a hard disk or an optical disk.

Further, when there is constructed a constitution having a power transmission mechanism attaching an output shaft to the moving body 8 and transmitting torque from the output shaft, there can be realized a dive mechanism by the ultrasonic motor per se.

As described above, according to the invention, a command signal for controlling a state of a self-excited oscillation circuit constituting a drive circuit, is set in a range capable of stably driving an ultrasonic motor in an aimed state.

That is, firm self-excited oscillation is provided by an ultrasonic motor apparatus constituting a self-excited oscillation circuit by a vibrating body having a piezoelectric element and an amplifier circuit for oscillating the vibrating body in a predetermined natural mode and operating a moving body in contact with the vibrating body, the self-excited oscillation circuit can be controlled to be brought into a drive state or a stop state in accordance with a drive command signal or a stop command signal from a control signal generating circuit, and the control signal generating circuit is set such that a length TD of the drive command signal is made to be longer than a time period t1 from when the drive command signal is applied to the self-excited oscillation circuit until the self-excited circuit starts oscillating.

In this case, particularly, when there is generated oscillation of sprius oscillation or the like at rise of the oscillation, the aimed oscillation can firmly be provided by constituting the length of the time period t1 by the time period t2 at which a signal at a frequency used for driving the moving body starts oscillating.

Further, the ultrasonic motor is firmly operated by making the length TD of the drive command signal longer than the time period t3 until the oscillation grows and reaches an amplitude value capable of operating the moving body.

Further, by setting the length TD of the drive command signal longer than the time period t4 until the oscillation grows and is saturated to a specific amplitude value, voltage applied to the ultrasonic motor is provided with a value in a steady state and the torque is not lowered even when the ultrasonic motor is driven intermittently.

Further, by setting the length TD of the drive command signal between the time period t3 and the time period t4, ultra fine movement of the ultrasonic motor can be realized and high precision positioning control can be carried out.

Further, by setting the control signal generating circuit such that the length TS of the stop command signal become shorter than the time period t9 from when the stop command signal is inputted to the self-excited oscillation circuit until the oscillation is stopped, stable oscillation continues and control of rotational number can be carried out without lowering the torque of the ultrasonic motor.

When the ultrasonic motor is driven by alternately inputting the drive command signal and the stop command signal to the self-excited oscillation circuit, the time period TD and the time period TS are set such that an amount of changing a voltage value of an input unit of the amplifier circuit during a time period of applying the drive command signal in the time period TD, becomes larger than an amount of changing the voltage value of the input unit of the amplifier circuit during a time period of applying the stop command signal in the time period TS.

Further, by setting the frequency 1/(TD+TS) of a control command signal constituted by the time period TD of the drive command signal and the time period TS of the stop command signal to be higher than the frequency in the predetermined natural mode, an amplitude value of the drive signal can be controlled constant in accordance with a ratio of the time periods TD and TS and the frequency 1/(TD+TS) and the rotational number can be controlled while restraining a variation in rotational number or a variation in torque.

Further, by making variable a number of the amplifier circuits which are brought into the active state among the plurality of amplifier circuits, the state of driving/stopping the ultrasonic motor can be controlled without stopping the oscillation and the ultrasonic motor can be driven stably and in excellent response.

Further, by using the ultrasonic motor to which the invention is applied, there is realized an electronic apparatus which is small-sized and is driven with low power consumption.

What is claimed is:

1. An ultrasonic motor comprising:
   a self-excited oscillation circuit comprised of a vibrating body having a piezoelectric element and an amplifier circuit for amplifying an output signal of the piezoelectric element for oscillating the vibrating body in a predetermined natural mode;
   a moving body disposed in contact with the vibrating body and driven in response to oscillation of the vibrating body; and
   a control signal generating circuit for outputting to the self-excited oscillation circuit a drive command signal or a stop command signal to bring the self-excited oscillation circuit into a drive state to drive the moving body or a stop state, respectively;
   wherein the control signal generating circuit is set so that a length of the drive command signal is a time period required for the self-excited oscillation circuit to start oscillating at a frequency corresponding to a given frequency for driving the moving body.

2. An ultrasonic motor comprising:
   a self-excited oscillation circuit comprised of a vibrating body having a piezoelectric element and a plurality of amplifier circuits having active and inactive states for amplifying an output signal of the piezoelectric element and returning the amplified signal to the piezoelectric element for oscillating the vibrating body in a predetermined natural mode; and
   a moving body disposed in contact with the vibrating body and driven in response to oscillation of the vibrating body;
   wherein a first oscillating state of the self-excited oscillation circuit for oscillating the moving body and a second oscillating state for not oscillating the moving body are switched by varying a number of the plurality of amplifier circuits which are brought into an active state.

3. An ultrasonic motor comprising: a self-excited oscillation circuit comprised of a vibrating body having a piezoelectric element and an amplifier circuit for amplifying an output signal of the piezoelectric element for oscillating the vibrating body in a predetermined natural mode; a moving body disposed in contact with the vibrating body and driven in response to oscillation of the vibrating body; and a control signal generating circuit for outputting to the self-excited oscillation circuit a drive command signal or a stop command signal to bring the self-excited oscillation circuit into a drive state to drive the moving body or a stop state, respectively; wherein a length of the drive command signal from the control signal generating circuit is longer than a time period required for an oscillation amplitude of the self-excited oscillation circuit to increase and reach a value sufficient for driving the moving body.

4. An ultrasonic motor comprising: a self-excited oscillation circuit comprised of a vibrating body having a piezoelectric element and an amplifier circuit for amplifying an output signal of the piezoelectric element for oscillating the vibrating body in a predetermined natural mode; a moving body disposed in contact with the vibrating body and driven in response to oscillation of the vibrating body; and a control signal generating circuit for outputting to the self-excited oscillation circuit a drive command signal or a stop command signal to bring the self-excited oscillation circuit into a drive state to drive the moving body or a stop state, respectively; wherein a length of the drive command signal from the control signal generating circuit is longer than a time period required for an oscillation amplitude of the self-excited oscillation circuit to increase and become constant.

5. An ultrasonic motor comprising: a self-excited oscillation circuit comprised of a vibrating body having a piezoelectric element and an amplifier circuit for amplifying an output signal of the piezoelectric element for oscillating the vibrating body in a predetermined natural mode; a moving body disposed in contact with the vibrating body and driven in response to oscillation of the vibrating body; and a control signal generating circuit for outputting to the self-excited oscillation circuit a drive command signal or a stop command signal to bring the self-excited oscillation circuit into a drive state to drive the moving body or a stop state, respectively; wherein a length of the drive command signal from the control signal generating circuit is in a range between a length longer than a time period required for an oscillation amplitude of the self-excited oscillation circuit to increase and reach a value sufficient for driving the moving body and a length longer than a time period required for an oscillation amplitude of the self-excited oscillation circuit to increase and reach a constant value.

6. An ultrasonic motor comprising:
a self-excited oscillation circuit comprised of a vibrating body having a piezoelectric element and an amplifier circuit for amplifying an output signal of the piezoelectric element for oscillating the vibrating body in a predetermined natural mode;
a moving body disposed in contact with the vibrating body and driven in response to oscillation of the vibrating body; and
a control signal generating circuit for outputting to the self-excited oscillation circuit a drive command signal or a stop command signal to bring the self-excited oscillation circuit into a drive state or a stop state, respectively;
wherein a length of the stop command signal from the control signal generating circuit is made to be shorter than a time period from when the stop command signal is inputted to the self-excited oscillation circuit until the oscillation is stopped.

7. An ultrasonic motor comprising:
a self-excited oscillation circuit comprised of a vibrating body having a piezoelectric element an amplifier circuit for amplifying an output signal of the piezoelectric element for oscillating the vibrating body in a predetermined natural mode;
a moving body disposed in contact with the vibrating body and driven in response to oscillation of the vibrating body; and
a control signal generating circuit for alternately outputting to the self-excited oscillation circuit a drive command signal or a stop command signal to bring the self-excited oscillation circuit into a drive state or a stop state, respectively, to thereby drive the ultrasonic motor;
wherein when the ultrasonic motor is driven by alternately inputting the drive command signal and the stop command signal to the self-excited oscillation circuit, a time period for applying the drive command signal and a time period for applying the stop command signal are set so that an increase amount of a voltage by the drive command signal is larger than a decrease amount of a voltage by the stop command signal.

8. An ultrasonic motor comprising:
a self-excited oscillation circuit comprised of a vibrating body having a piezoelectric element and an amplifier circuit for amplifying an output signal of the piezoelectric element for oscillating the vibrating body in a predetermined natural mode;
a moving body disposed in contact with the vibrating body and driven in response to oscillation of the vibrating body; and
a control signal generating circuit for alternatively outputting to the self-excited oscillation circuit a drive command signal or a stop command signal to bring the self-excited oscillation circuit into a drive state or a stop state, respectively, to thereby drive the ultrasonic motor;
wherein when the ultrasonic motor is driven by alternatively inputting the drive command signal and the stop command signal to the self-excited oscillation circuit, a frequency $1/(TD+TS)$, where TD is a time period of the drive command signal and TS is a time period of the stop command signal, is higher than a frequency in the predetermined natural mode.

9. In an electronic apparatus having an output mechanism for producing an output movement; an ultrasonic motor according to claim 8 for driving the output mechanism.

10. In an electronic apparatus having an output mechanism for producing an output movement; an ultrasonic motor according to claim 2 for driving the output mechanism.

11. In an electronic apparatus having an output mechanism for producing an output movement; an ultrasonic motor according to claim 1 for driving the output mechanism.

12. In an electronic apparatus having an output mechanism for producing an output movement; an ultrasonic motor according to claim 3 for driving the output mechanism.

13. In an electronic apparatus having an output mechanism for producing an output movement; an ultrasonic motor according to claim 4 for driving the output mechanism.

14. In an electronic apparatus having an output mechanism for producing an output movement; an ultrasonic motor according to claim 5 for driving the output mechanism.

15. In an electronic apparatus having an output mechanism for producing an output movement; an ultrasonic motor according to claim 6 for driving the output mechanism.

16. In an electronic apparatus having an output mechanism for producing an output movement; an ultrasonic motor according to claim 7 for driving the output mechanism.

* * * * *